Patented May 31, 1938

2,119,329

UNITED STATES PATENT OFFICE 2,119,329

PROCESS OF TREATING COFFEE

Herman Heuser, Evanston, Ill.

No Drawing. Application March 20, 1935,
Serial No. 11,953

5 Claims. (Cl. 99—68)

This invention relates to the treatment of coffee and particularly to a process for increasing the roasting fitness of green coffee, and also to the coffee prepared by such process.

By the use of my present invention I am enabled to increase the roasting fitness of green coffee to such an extent that the roasted coffee made from it and the beverage made from the roasted coffee are greatly improved.

It is well known that the majority of green coffees when roasted each by itself by the heretofore known methods, produce a roasted coffee that gives a beverage which is more or less unsatisfactory because of the lack of purity and fullness in its aroma and taste. There are, however, some coffees as, for example, the Sumatra coffees, known as Mandheling, and Ankola and Ayer Bangies, which when roasted each by itself give a roasted coffee and a coffee beverage of very good qualities. These select coffees, however, demand a very high price. In order, therefore, to produce a satisfactory roasted coffee that can be sold at a reasonable price, it has become the general custom to blend a low grade or medium grade green coffee with one or two high grade or highest grade coffees before the coffee is roasted, the low grade or medium grade coffee forming the bulk of the blend. The blending may also take place after the roasting, that is to say, after each of the individual coffees for making the blend has been roasted by itself.

While, as set forth in my Patent No. 1,956,290, for "The preparation of coffee," the presence of a small portion of a reducing agent in roasted coffee preserves the coffee against rancidity in the trade containers and the coffee beverage made from it against the detrimental effects of the air or oxygen, I have discovered that the roasting fitness of green coffee is greatly improved when it contains a small portion of an oxidizing agent, the resulting roasted product and the beverage made from the same being pure in aroma and flavor and considerably richer in aroma and flavor and more full-bodied in taste. The improvements resulting from the presence of the oxidizing agent in the coffee are so great that a superior roasted coffee is produced directly from any low grade or medium grade coffee without the necessity of blending, that is, as good and frequently better than the roasted product made from the most select, high priced coffee.

Any harmless oxidizing agent may be employed for carrying out my invention, such, for example, as the perchlorates, chlorates, the hypochlorites and the permanganates. Furthermore, perchloric acid, chloric acid and hypochlorous acid may also be employed with entire satisfactory results. Generally, however, I prefer to employ the alkali perchlorates and the alkali chlorates for carrying out my invention. I generally prefer to employ such oxidizing agents as are soluble in water at least in the proportion in which they are employed.

The incorporation of the oxidizing agent into the green coffee berries may be carried out in any suitable way, provided the proper amount of oxidizing agent is introduced into the green coffee berries. This amount varies for each oxidizing agent and is, as I have discovered, for potassium perchlorate and sodium perchlorate about 0.14 part by weight of the perchlorate to 100 parts by weight of coffee; for potassium chlorate and sodium chlorate it is 0.10 part by weight of the chlorate to 100 parts by weight of the coffee; for a perchloric acid solution having a specific gravity of 1.12, it is 0.15 part by weight to 100 parts by weight of coffee; and for the usual commercial sodium hypochlorite solution containing approximately 5% of chlorine, it is 0.25 part by weight of the solution to 100 parts by weight of the coffee. In case of the incorporation of a manganese containing oxidizing agent into the coffee, for example, potassium permanganate, it is about 0.02 part by weight of the permanganate to 100 parts by weight of the coffee, the resulting roasted coffee containing manganese as a new mineral constituent. I wish it understood, however, that the aforesaid amounts or proportions of oxidizing agents may be slightly decreased or increased.

I have also discovered that the incorporation of the oxidizing agent into the green coffee berries can be carried out by spraying the berries, while they are being constantly mixed with an absorbable quantity of water containing the required amount of the oxidizing agent to be introduced into the coffee berries.

An apparatus well adapted for carrying out the incorporation of the water-dissolved oxidizing agent into the coffee by spraying is a revolving cylinder made of any suitable metal, preferably inert to the oxidizing-agent-containing water, and provided with a spraying device and means for thoroughly mixing or stirring the coffee berries during the spraying operation.

I have also with very good results employed for this spraying of the oxidizing agent into the coffee the apparatus used for roasting the coffee. However, as the roasting cylinder is perforated the spraying which takes place through the loading opening of the revolving roasting cylinder must be so slow that the coffee berries absorb the water at the rate it is spread upon the berries. With the coffee and the spraying water at room temperature of say 20° C., the spraying is generally completed within one and one-half to two hours, the exact spraying period depending principally upon the exact amount of water containing the oxidizing agent.

The incorporation of the oxidizing agent into the coffee berries by spraying can be carried out in the coffee roasting cylinder within a small fraction of the aforesaid period of time by heating the green coffee in the roasting cylinder by the heating means with which it is equipped to a sufficiently elevated temperature, for example, 50 to 70° C., before the coffee berries are sprayed with the water containing the oxidizing agent; or by spraying the coffee berries in the revolving roasting cylinder with the water containing the oxidizing agent, this water having a sufficiently elevated temperature; or by employing both steps of heating the coffee berries and also heating the water to accelerate still more the incorporation of the oxidizing agent into the coffee. The great saving in time resulting from the heating referred to above increases the practicability of carrying out in the roasting apparatus both the incorporating of the oxidizing agent into the coffee and the roasting of the coffee.

I have further discovered that the incorporation of the oxidizing agent into the green coffee can also be carried out by steeping the green coffee in water containing the oxidizing agent. When the coffee berries being thus steeped have absorbed a certain quantity of water, which must contain the proper quantity of the oxidizing agent, the unabsorbed water is drained off from the coffee, whereupon the coffee berries are introduced into the roasting apparatus. I have also observed that the water absorbing capacity of green coffee berries is very high. Thus 100 parts by weight of coffee berries will absorb, when steeped sufficiently long at room temperature, or at any higher temperature, approximately 115 parts by weight of water as maximum quantity.

Among the objects of my invention is to so treat coffee berries as to so increase the roasting fitness of green coffee to such an extent that the roasted coffee made from it and the beverage made from the roasted coffee are greatly improved.

A further object is to carry out the steps of the process set forth wherein I produce a green coffee of superior quality and which may be sold on the market at a reasonable price.

Another object is to overcome the objections and difficulties heretofore set forth and to utilize the improved steps and the benefit of the advantages and new results described herein.

A still further object is to incorporate into the green coffee berries a small proportion of a suitable oxidizing agent and then roasting the coffee.

Another object is to incorporate into green coffee berries a small proportion of the oxidizing agent, then roasting the coffee berries and mixing with the whole roasted coffee berries a suitable reducing agent, and then comminuting the coffee and then filling it into trade containers.

A further object is to incorporate into decaffeinated coffee a small portion of an oxidizing agent.

Other objects, advantages and capabilities will herein more fully appear.

In the following I will describe a method suitable to carry out my invention by steeping the coffee in water containing the oxidizing agent:

An ordinary grade of Brazil coffee, say, for example, No. 4 Santos, preferably thoroughly cleaned from foreign matter and dust, is run into water in the proportion of 100 parts by weight of coffee berries to 300 parts by weight of water, while the water is preferably stirred by a mechanical stirrer, there having been previously dissolved in the 300 parts by weight of water 0.70 part by weight of potassium perchlorate.

At the start of the steeping operation a small perforated metal container containing a weighed-off sample of green coffee, say, for example, 100 grams of the same coffee that is being steeped, is submerged in the water of the steep, the tare of the container with its contents having been previously ascertained on an accurate scale. From time to time the small container is quickly taken out of the steep, shaken to free it from the adhering water, and weighed. When the weight of the container has increased by 60 grams the steeping of the coffee has been completed and the unabsorbed water is forthwith drained off from the steeped coffee, which, having absorbed 60 parts by weight of water, has absorbed 0.14 part by weight of potassium perchlorate.

With the steep having a room temperature of say 20° C., the steeping lasts generally one and one-half to two hours. The steeping period decreases as the temperature of the steep increases. Therefore, all that has to be done to shorten the steeping period to a fraction of the time stated is to raise the temperature of the steep sufficiently.

After the unabsorbed portion of the steeping water has been drained off from the coffee berries, the latter are run into any suitable roasting apparatus, wherein they may be roasted in the customary manner.

The coffee roasting apparatus should be a perforated metal cylinder made of any suitable metal, preferably inert, to the oxidizing agent-containing-water, which should be provided with a mixing or stirring device in the form of reverse spiral flanges to load the cylinder with coffee and to thoroughly mix the coffee berries during the heating. The apparatus should further be provided with easily controllable gas heating and air current producing means that heat the air as fast as required and pass it uniformly through the whole mass of coffee, and further with means for the rapid discharge of the roasted coffee from the roasting cylinder. In an apparatus of this kind the steeped coffee is introduced, while the cylinder is revolving and kept revolving, until the coffee has been discharged as finished product from the same.

The roasting may be so conducted that the stage where the chaff begins to separate from the coffee is reached within say 10 minutes from the commencement of heating, that the chaff is carried off from the coffee by the air current within the next 10 minutes, that the stage where the high coloring of the coffee begins is reached within the next 5 minutes, and that the desired shade of brown color has been reached within the next 2 to 4 minutes, and that the coffee, as soon as the desired shade of brown color has been reached, is rapidly discharged from the revolving cylinder into a receptacle, wherein the coffee is quickly cooled to room temperature by drawing cold air through the coffee spread out in a uniformly thick layer upon the perforated horizontal bottom of the cooling receptacle.

During the final stage of the roasting, frequent coffee samples should be taken from the roasting cylinder and be compared with a standard roasted coffee sample within easy reach having the desired shade of brown color, in order to facilitate the timing of the precise moment when the heat has to be turned off and the coffee to be discharged from the roasting apparatus.

While the oxidizing agent acts, to a certain degree, upon the coffee substances prior to the browning or roasting of the coffee, I have observed that the real effect of the oxidizing agent upon the coffee does not take place until the coffee has reached the high temperature or browning stage, where the chemical reaction of the oxidizing agent present in the coffee berries greatly increases the aroma-flavor-and-taste-producing effect of the heat upon the coffee substances.

The roasting process lasts a little longer than customarily is the case owing to the relatively very large amount of steep water or moisture that has to be evaporated from the coffee during the stages that lead up to the roasting proper.

The cooled roasted coffee is preferably put into closed storage tanks, from which it is conveyed as soon as possible into the trade containers by way of a mill to comminute the coffee to the desired degree of fineness and by way of an automatic scale in order to deliver a like amount of coffee into each trade container.

The roasted coffee thus produced by means of my invention is thereby distinguished from roasted coffee made by the customary methods, in that it is very pure and unusually rich in aroma and flavor, and that the coffee beverage made from it is very much better and richer in aroma and flavor and more full-bodied in taste than the customary coffee beverages made from a low grade or medium grade coffee and even better than the coffee beverage that is obtained from the highest grade coffee.

While the oxidizing agents employed by me greatly promote the production of aroma, flavor and taste by the heat during the roasting of the coffee, the reducing agents are the preservers of these things. Therefore, in accordance with my Patent No. 1,956,290, a small quantity of a suitable reducing agent, such as, for example, sodium pyrosulphite, is incorporated by me into the roasted coffee thus produced by mixing the whole roasted coffee berries in a suitable mixing apparatus with the powdered sulphite in the proportion of say 0.3 part by weight to 100 parts by weight of the whole roasted coffee berries and thereupon grinding the berries to the desired fineness. This has the advantage that the ground coffee will keep in the trade containers for a very long period of time, and that it will keep for practically any length of time when the trade packages are hermetically sealed, and it has the further advantage that should the coffee absorb moisture during the grinding or thereafter, or come in contact with light, it will not become rancid, even if the added oxidizing agent should not have been used up entirely during the roasting.

The yield in roasted coffee made by the use of my invention averages about 86.50 percent. This is a high yield considering that the roasted coffee thus produced contains only a small amount of moisture, generally about 1.50 percent, and that the yield in roasted coffee customarily obtained averages only about 84 percent.

My invention is also very useful in the preparation of decaffeinated coffee because of the great depreciation always connected with the decaffeinating of coffee being removed during the roasting of the coffee by the effect of the oxidizing agent incorporated into the decaffeinated green coffee, the depreciation of the decaffeinated coffee being due to the far-reaching dissolving effect of the solvents customarily employed to extract the caffeine from the green coffee berries prior to the roasting of the berries, for these solvents being also fat solvents, such as, for example, trichloromethane, tetrachloromethane, benzene, petroleum ether, ethyl ether and alcohol, extract along with the caffeine, an important constituent of the coffee, namely, the fat contained in the coffee. The depreciation is also due to the ill smelling odor of the residual remains left in the decaffeinated coffee from the customary solvents. These objections are overcome by the present invention.

Instead of roasting the green coffee incorporated with an absorbable quantity of water containing the oxidizing agent, the coffee may be only sufficiently heated to merely dry but not roast the coffee in order to preserve the coffee in its green state, drying of green coffee to at least the original moisture content of the coffee being sufficient for the preservation of the green coffee incorporated with an oxidizing agent. The drying preserves the green coffee and the oxidizing agent present in the coffee berries for practically any length of time. In the dry condition the green coffee represents a greatly improved coffee because of its greatly increased roasting fitness. The perchlorates are especially well fitted as oxidizing ingredients of commercial green coffee, because they are very stable not only at the temperatures at which the green coffee is kept in the warehouses, but also at the temperatures at which the moisture content of the green coffee containing the oxidizing agent is reduced to the original moisture content of green coffee.

It is also to be understood that other oxidizing agents and other reducing agents may be used, and some changes be made in the steps and details, without departing from the spirit of my invention.

Having now described my invention,

I claim:

1. The process of making roasted coffee, which comprises incorporating an oxidizing agent into the green coffee by spraying the coffee with an absorbable quantity of water containing a small proportion of a suitable oxidizing agent, introducing the coffee into a roasting apparatus and roasting the coffee.

2. The process of making roasted coffee, which comprises revolving the perforated roasting cylinder of a coffee roasting apparatus, introducing the green coffee into the roasting cylinder, spraying the coffee in the roasting cylinder with an absorbable quantity of water containing a small proportion of a suitable oxidizing agent, conducting the spraying at the rate of the absorption of the water by the coffee, and heating the coffee, after the spraying has been completed, to roast the coffee.

3. The process of making roasted coffee, which comprises steeping the green coffee in water containing a small proportion of an oxidizing agent of the kind described, steeping simultaneously a weighed off sample of the coffee in the water of the steep, weighing the coffee sample freed from its adhering water from time to time to determine the quantity of water the coffee has absorbed, draining off the unabsorbed water from the coffee when the sample of coffee has absorbed as much water as contains the required amount of oxidizing agent, introducing the coffee into a roasting apparatus and roasting the coffee.

4. The process of making roasted coffee, which comprises steeping green coffee in water containing a small proportion of a suitable oxidizing agent to incorporate the oxidizing agent into the coffee, draining the unabsorbed water from the coffee, and roasting the coffee.

5. The process of making roasted coffee, which comprises spraying the green coffee with water containing a small proportion of a suitable oxidizing agent, while the coffee is being stirred, heating the coffee to evaporate the water, continuing the heating until the coffee has been roasted to the desired shade of brown color, stopping the heating of the roasted coffee and cooling the roasted coffee.

HERMAN HEUSER.